United States Patent [19]

Neefe

[11] Patent Number: 4,710,327
[45] Date of Patent: * Dec. 1, 1987

[54] METHOD OF MOLDING AN EYE COLOR CHANGE CONTACT LENS BLANK

[76] Inventor: Charles W. Neefe, 811 Scurry St., P.O. Box 429, Big Spring, Tex. 79720

[*] Notice: The portion of the term of this patent subsequent to Dec. 1, 2004 has been disclaimed.

[21] Appl. No.: 879,296

[22] Filed: Jun. 27, 1986

Related U.S. Application Data

[63] Continuation-in-part of Ser. No. 832,381, Feb. 24, 1986, abandoned.

[51] Int. Cl.[4] ............................................. B29D 11/00
[52] U.S. Cl. ..................................... 264/1.7; 264/2.7; 351/162; 425/808
[58] Field of Search ................... 264/1.1, 2.7, 1.7, 2.1; 425/808; 351/162, 165, 160 R, 160 H

[56] References Cited

U.S. PATENT DOCUMENTS

| 3,189,914 | 6/1965 | Gusewitch et al. | 351/162 |
| 3,270,099 | 8/1966 | Camp | 264/1.8 |
| 3,560,598 | 2/1971 | Neefe | 264/1.8 |
| 3,984,506 | 10/1976 | Tsuetaki | 264/1.8 |
| 4,460,523 | 7/1984 | Neefe | 264/1.1 |

FOREIGN PATENT DOCUMENTS 356832  9/1931  United Kingdom ............... 351/165

*Primary Examiner*—James Lowe

[57] ABSTRACT

A cosmetic contact lens is made by molding a colored cylinder with a cone shaped cavity at one end. A transparent monomer is polymerized in this cavity. The opposite end of the cylinder is cut to form a truncated cone in its outer surface. A clear and transparent monomer is polymerized to fill in the truncated cone portion of the cylinder. A contact lens is cut from the cylinder to form a lens having a colored iris area, and clear pupil and peripheral areas.

6 Claims, 8 Drawing Figures

METHOD OF MOLDING AN EYE COLOR CHANGE CONTACT LENS BLANK

This is a continuation-in-part of application Ser. No. 832,381 entitled; "EYE COLOR CHANGE CONTACT LENS BLANK", filed Feb. 24, 1986 by Charles W. Neefe, now abandoned.

The desire to change and enhance the apparent color of the eye was recorded by the Egyptians five thousand years ago. Cosmetic makeup for the eye area accounts for the larger percentages of the cosmetic sales today.

PRIOR ART

Several contact lenses have been produced in an effort to achieve cosmetic eye color change.

One attempt employed a laminated structure with a painted opaque plastic member. The result was a thick heavy lens which was difficult to fabricate and difficult to wear. A later attempt employed a colored opaque plastic porous member surrounding a clear cylinder from which the lens was cut by lathing. This resulted in a lens having a pupil and iris pattern and the porous member had tendencies to flake and chip at the edge. (U.S. Pat. No. 3,454,332-Siegel).

A third generation of colored lenses provided a thin layer of colored opaque markings placed in a clear material. The opaque colored markings radiated from the center of the clear material in a geometric pattern.

U.S. Pat. Nos. 4,460,523 and 4,472,327, Neefe, describe methods of making cosmetic contact lenses wherein the lens segments are joined vertically through the lens.

Fuhrman, international publication, No. WO83/03480, October, 1983 discloses a cosmetic lens having horizontal color laminations.

SUBJECT OF THE INVENTION

The present invention provides a cosmetic contact lens made from a two or three layered molded cosmetic contact lens blank. The cone shaped segments are laminated together by polymerizing the cone shaped layers, one upon the other. The interface between the layers is a truncated cone or a cone. A cosmetic lens having a concave curvature which intersects all layers of the blank is cut from the cosmetic blank.

The size of the central pupil and the iris area of the lens is controlled by the depth the concave surface is cut into the blank. A blank cut to a thin center thickness will have a larger pupil and iris area than a blank cut to thicker center thickness.

The addition of daylight fluorescent colorants, which fluoresce visibly in the light of day, to the cosmetic lens adds a new and striking appearance to the eye not previously known.

Daylight fluorescent colorants are transparent organic dyes which are capable of visibily fluorescing in the daylight while in a solid state solution.

Certain substances, especially a number of organic dyes, have the property of fluorescing under visible light at the blue and green region of the visible spectrum. Ultraviolet light is not required. The fluorescence of these organic dyes is associated with the individual dye molecules; in order for them to fluoresce efficiently, they must be dissolved in fairly low concentrations in a solvent for the dyes. Due to the nature of the dyes used, it is necessary to have an organic medium or carrier to put them into solution. The type of material which meets the requirements for a carrier matrix for the dues is an organic hydrophilic resin.

The physical structure of the fluorescent colorants is amorphous, or non crystalline. In contrast to most other colorants, they are not formed by precipitation and do not consist of particle agglomerates.

Daylight fluorescent colorants are stable to indoor light or conditions of outdoor light other than extended exposure to direct light.

It is possible to mix more than one fluorescent colorant and non-fluorescent colorants in the same formula, to obtain intermediate hues.

Daylight fluorescence is greatly increased when the fluorescent colorant is in a hydrophilic matrix. Water in the hydrophilic material increases the fluorescence up to 300 percent. Water blocks infrared and transmits the green and blue wavelength which activate the fluorescent material. The water is in physical contact with the dye molecules and the hydrophilic lens material, this increasing the light transmission efficiency to and from the lens.

The ability to fluoresce visibly under bright daylight conditions and radiate colored light which emanates from within the lens provides a color enhancement of the eye not previously known or possible.

Two types of molded blanks are made, (1) for cosmetic contact lenses smaller than the cornea, usually made from hard gas permeable material, (2) cosmetic contact lenses larger than the cornea usually made from soft hydrophilic material. The lens being larger that the cornea is supplied with a clear transparent peripheral area which extends beyond the lymbus of the cornea.

The advantage of molding the blanks is the reproducibility provided. Many identical blanks can be economically supplied.

The advantages of the cone shaped pupil material insert is that the finishing laboratory can make any size lens pupil required. The depth of the concave lens curve into the cosmetic blank controlls the lens pupil size. A deeper concave cut intersects the lens pupil cone at a larger pupil diameter. The enlargement of the pupil cone intersection is proportional to the material removed when cutting the concave lens curvature. This allows the finishing laboratory to easily arrive at the desired lens pupil size.

DESCRIPTION OF THE PREFERRED EMBODIMENT

Figure 1:
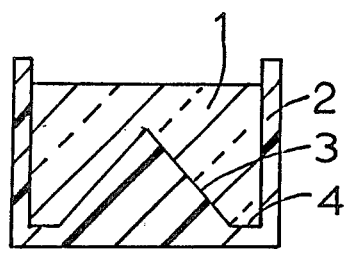
FIG. 1 shows the mold with the iris material in place, in section.
Figure 2:
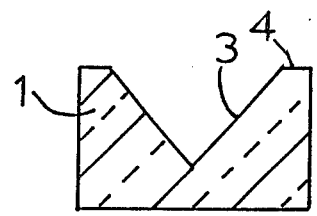
FIG. 2 shows the blank iris segment removed from the mold, in section.
Figure 3:
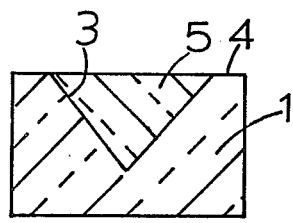
FIG. 3 shows the cone shaped pupil depression filled with the transparent pupil polymer, in section.
Figure 4:
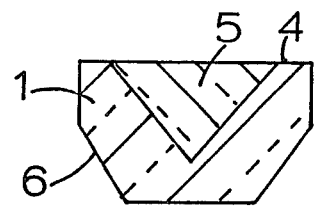
FIG. 4 shows the blank with the peripheral cone, in section.
Figure 5:
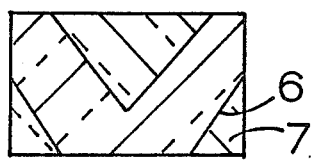
FIG. 5 shows the completed blank, in section.

A concave cylinderical mold, 2 FIG. 1, having a convex cone, 3 FIG. 1, centered in the bottom of the cylinder, 4 FIG. 1, is made from polypropylene, polyethylene, nylon or silicone. A liquid monomer, 1 FIG. 1, containing a colorant, either daylight fluorescent, translucent or opaque is placed in the mold, 2 FIG. 1, and polymerized to form a solid filling the mold, 2 FIG. 1. The cone surface, 3 FIG. 2, and the orientation ring, 4 FIG. 2, were made by cast molding. A transparent monomer, 5 FIG. 3, is placed in the concave cone, 3 FIG. 3, and allowed to polymerize to form a solid. To make hard cosmetic lenses smaller than the cornea the blank is now completed. The orientation ring, 4 FIGS. 3 and 4, is aligned in a lathe collate and the convex cone surface, 6 FIG. 4, is cut. A clear monomer, 7 FIG. 5, is cast in the convex cone, 6 FIG. 5, to complete the blank for soft lenses larger than the cornea.

Figure 6:
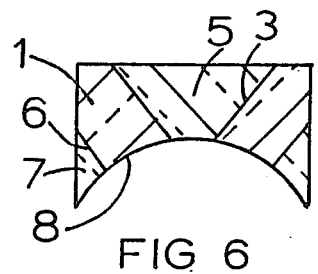
FIG. 6 shows the blank with the concave lens curve cut, in section.
Figure 7:
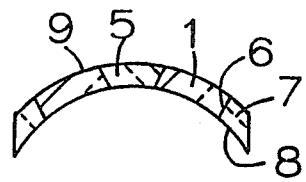
FIG. 7 shows the finished lens, in section.
Figure 8:
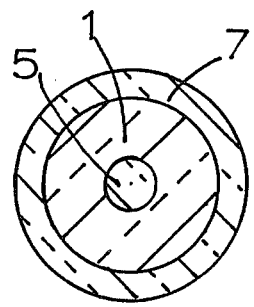
FIG. 8 shows the finished lens from the front.

A concave curve, 8 FIG. 6, is cut into the blank intersecting the clear peripheral area, 7 FIG. 6, the colored fluorescent iris area, 1 FIG. 6, and the cone shaped pupil area, 5 FIG. 6, the cone shaped segment boundaries, 3 FIG. 6, and 6 FIG. 6, are crossed. A deeper cut concave surface, 8 FIG. 6, provides a larger pupil. A shallower cut, leaving a thicker blank center thickness provides a smaller pupil. The lens is completed by cutting the convex lens surface, 9 FIG. 7. The convex lens surface also intersects the clear peripheral area, 7 FIG. 7, the fluorescent iris area, 1 FIG. 7, and the pupil area, 5 FIG. 7. A cosmetic lens having a predetermined pupil size, 5 FIG. 8, and an iris area, 1 FIG. 8, surrounded by a clear transparent peripheral zone, 7 FIG. 8, has been provided from a molded cosmetic lens blank.

Various modifications can be made without departing from the spirit of this invetnion or the scope of the appended claim. The constants set forth in this disclosure are given as examples and are in no way final or binding. In view of the above, it will be seen that the several objects of the invention are achieved and other advantages are obtained. As many changes could be made in the above constructions and and methods without departing from the scope of the invention, it is intended that all matter contained in the above description shall be interpreted as illustrative and not in a limiting sense.

I claim:

1. A method of molding a cosmetic contact lens blank from which a cosmetic contact lens is made by the steps of providing a cylinder shaped mold having a centrally located convex cone at the bottom of the cylinder, filling the mold with a colored liquid lens monomer, polymerizing the colored liquid lens monomer to form a colored cylinder shaped polymer body having a concave centrally located cone at one end of the cylinder, filling the concave centrally located cone with a transparent liquid lens monomer, polymerizing the transparent liquid lens monomer, cutting a peripheral convex cone on the opposite end of the cylinder from the centrally located concave cone, filling the peripheral convex cone with a clear transparent liquid lens monomer, polymerizing the clear transparent liquid lens monomer, to form a cosmetic contact lens blank, cutting a concave lens curvature that intersects the clear transparent peripheral convex cone and the colored cylinder shaped body and the transparent centrally located cone, providing a larger lens pupil and iris area by cutting the concave contact lens curve deeper into the cosmetic contact lens blank, cutting a convex contact lens curve intersecting the transparent centrally located cone to form the cosmetic lens pupil area and intersecting the colored cylinder shaped polymer body to form the cosmetic lens iris area, and intersecting the clear transparent peripheral cone to form the clear peripheral lens area.

2. The subject matter of claim 1 wherein the cosmetic lens is a hard lens.

3. The subject matter of claim 1 wherein the cosmetic lens is a soft lens.

4. The subject matter of claim 1 wherein a daylight fluorescent and non-fluorescent colorant is present.

5. The subject matter of claim 1 wherein a daylight fluorescent or non-fluorescent colorant is added to the lens.

6. The subject matter of claim 1 wherein the centrally located cone is truncated.

* * * * *